Sept. 29, 1964 R. FERTIER 3,150,744
INDIVIDUAL SAFETY ELEVATOR
Filed July 21, 1961 3 Sheets-Sheet 3

United States Patent Office 3,150,744
Patented Sept. 29, 1964

3,150,744
INDIVIDUAL SAFETY ELEVATOR
Raymond Fertier, 61 Blvd. Joseph Vallier,
Grenoble, Isere, France
Filed July 21, 1961, Ser. No. 125,815
8 Claims. (Cl. 182—142)

This invention relates to individual safety elevators, commonly known as "spiders." These devices generally offer little safety in use and are frequently the cause of serious falls. In fact, the safety devices with which these apparatus are provided are precarious, in particular as regards the braking of the drum of the hoist, generally realised by means of runners with variable spacing, or more simply by means of a pawl and ratchet mechanism.

It is an object of the invention to realise an individual elevator offering great safety in use both for ascending and descending movements.

Other objects and advantages of the invention will become readily apparent upon reading the following specification taken in conjunction with the accompanying drawing submitted for the purpose of illustration only and not intended to limit the scope of the invention and in which.

Figure 1:
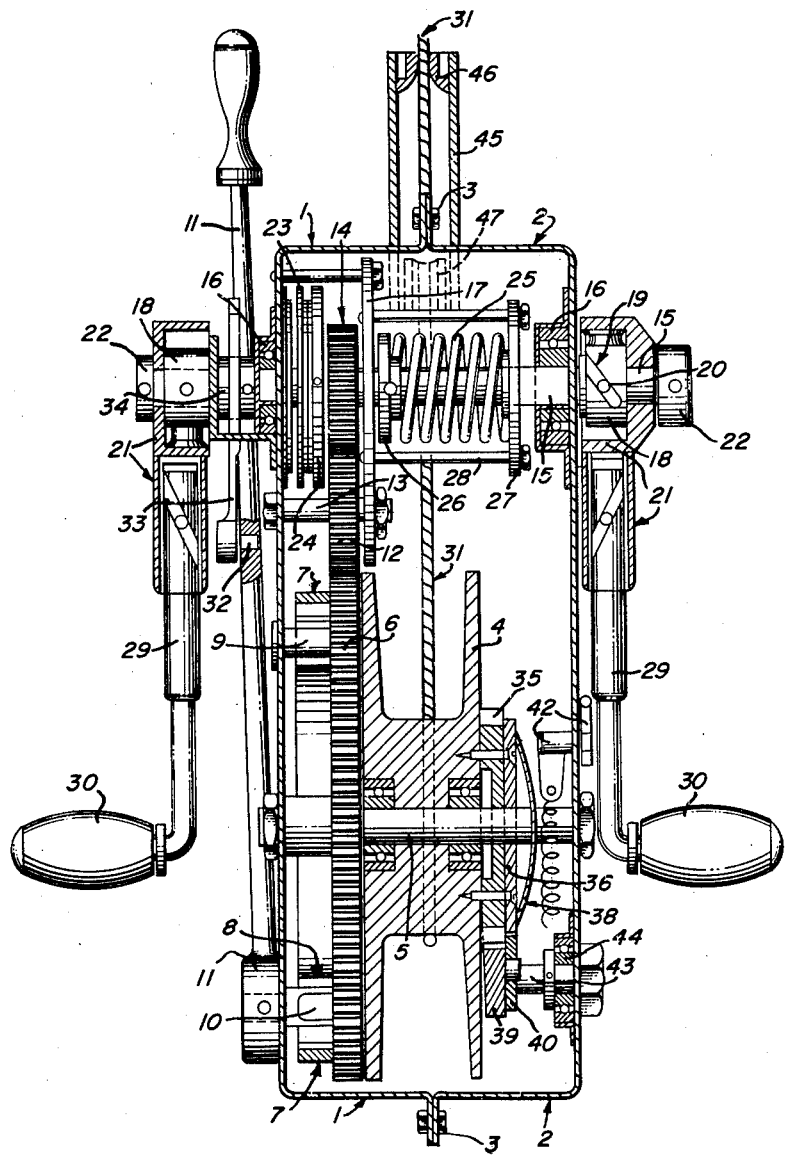
FIG. 1 is a longitudinal section of the apparatus, showing clearly the different safety-brake devices.

As is illustrated in particular in FIG. 1, the safety-lift comprises, in a housing in two parts 1 and 2, assembled by means of the bolts 3, a grooved sheave 4 fitted on a shaft 5 supported at the ends by the lateral sides of the housing. One of the flanges of the sheave is solid with a cog wheel 6 carrying an internal brake-drum 7 in which the brake shoes 8 are articulated at 9 and controlled by a cam 10 which determines their spacing. Shaft 9 and cam 10 are disposed on the lateral side of the main housing 1. The drum brake is controlled by an outside lever 11, pinned to the end of cam 10. It will be understood that the movement of lever 11 determines the spacing of the shoes 8, and thus the braking of the sheave 4, these details being better seen in FIG. 2.

Figure 2:
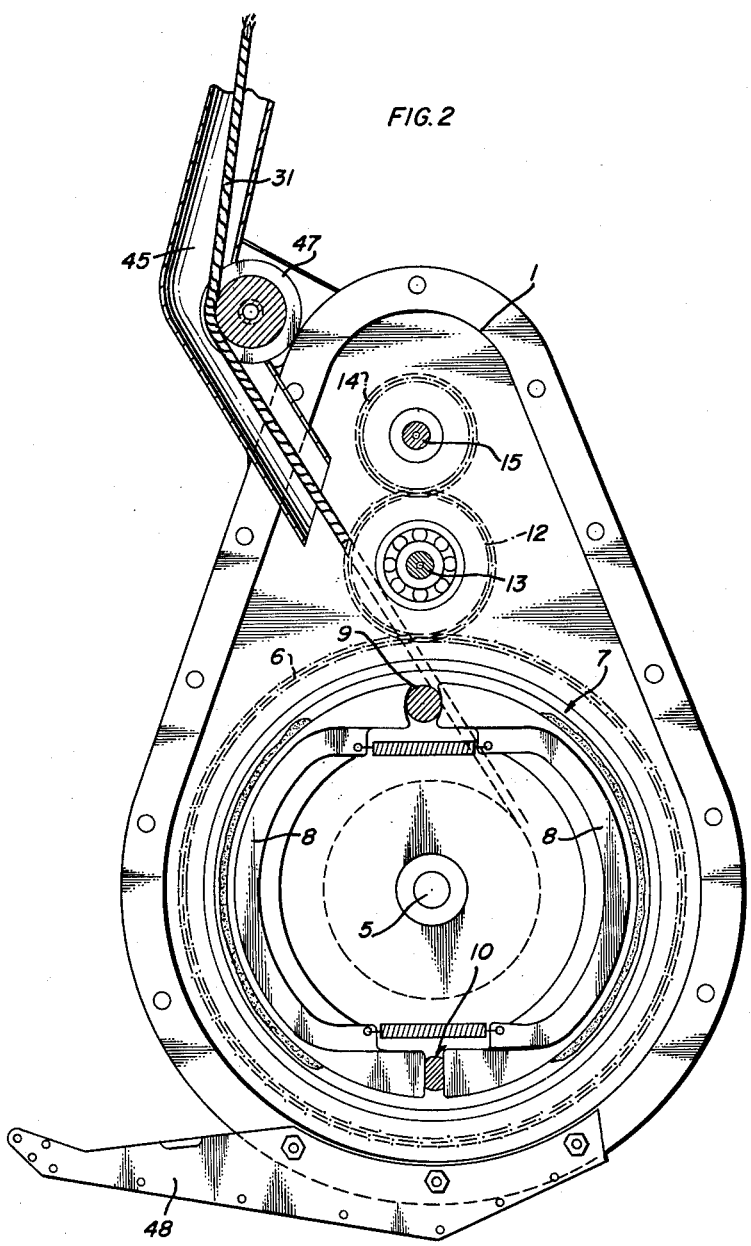
FIG. 2 is a view in elevation of the side on which the brake-drum is disposed on the sheave.
Figure 3:
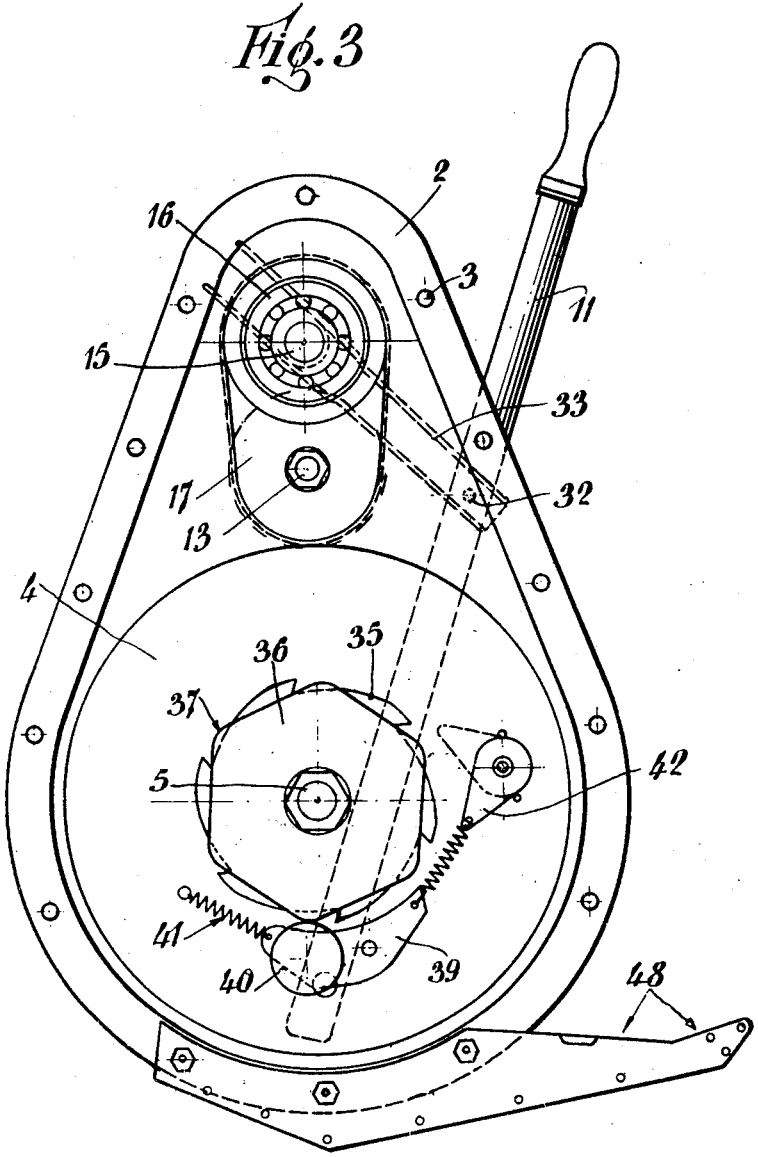
FIG. 3 is also a view in elevation of the side of the apparatus where the safety-brake is disposed.

According to FIGS. 1 and 2, the cog wheel 6 of sheave 4 is controlled by a loose intermediate sprocket 12 on a shaft 13 fixed to the housing 1. The rotation of this sprocket is determined by a gear 14, keyed to a drive-shaft 15, situated at the upper part of housings 1 and 2, and running in ball-bearings 16 situated in cups fixed to the two parts 1 and 2 of the housing. This drive-shaft also passes through an assembly-plate 17 fixed to part 1 of the housing by means of struts 28 and carrying the end of the shaft 13 of the intermediate reducer sprocket 12.

The two ends of the drive-shaft 15, protruding from parts 1 and 2 of the housing are fitted with two collars 18, with a helicoidal slot 19, in which is engaged a pin 20 with which is provided each end of the drive-shaft 15. These two collars 18 are lodged in housings within two crank-carriers 21 fitted to the ends of the drive-shaft 15 by pinned flanges 22.

On the side 1 of the main housing, the drive-shaft 15 is fitted with a disc block 23, compressed between a backing plate 24 solid with the drive-shaft 15, and the interior surface of the housing. This disc block, which has the function of preventing rotation of the drive-shaft in the case which will be explained later, is constantly maintained in blocking or braking contact by means of the action of a spring 25 against a ring 26 solid with drive-shaft 15. This spring, pressing against a fixed plate 27, tends to direct the drive-shaft 15 in the blocking or braking direction, and determines the friction between the discs of block 23 which prevents any rotation of drive-shaft 15. In the crank-carriers 21 are fitted the cranks 29 with handles 30, used to rotate the drive-shaft 15 and thus the sheave 4, on which rolls the cable 31 by the intermediary of the gear-train 14, 13 and 6.

On lever 11 operating the drum brake 7 is fixed by a pin 32 a fork 33 straddling drive-shaft 15 between two collars 34. This fork is characterized by the fact that it is of unequal thickness, which increases towards the end opposite to that at which it is pinned. As a result, when lever 11 is operated, the fork slides on shaft 15, and moves it in the direction in which the disc block 23 works, or in the other direction thus cancelling the effect of the block 23 on the said shaft 15.

On the flange of sheave 4, on the side of housing 2, is fixed a ratchet-wheel 35 against which is solidly fitted a cam 36 with ramps 37 against which presses a spring washer 38. Pawl 39 carries a wheel 40 which is in constant contact with the profile of cam 36, as a result of the pull exerted by spring 41 which also prevents the engagement of the pawl in the notches of ratchet-wheel 35 when sheave 4 rotates slowly. However, a hand-release 42 can be used, if this is desired by the user, to engage the pawl in the notches of the ratchet-wheel, and thus stop the rotation of the sheave. The pawl 39 is in fact hinged on a pin 43, carried by the housing 2, through a ball-bearing 44.

The outlet of the cable 31 passes through a tube 45 which carries a case-hardened guide 46 at the end, and an idler pulley 47 inside.

The lower end of the apparatus is equipped with a suitable seat 48.

The operation of the apparatus is as follows:

On starting, a constant braking is exerted on the drive-shaft 15, determined by the compression of the disc braking on which is exerted the expansion effect of spring 25.

The upward movement, obtained by rotation of sheave 4 rolling-up cable 31, that is to say by turning of drive-shaft 15 by means of crank 29, results from a double operation:

The first operation consists in releasing the constantly braking block 23, taking place automatically when the user first moves the right-hand crank 29 which, due to the self-releasing collars 18 with helical slots 19, move the pins 20 axially of the drive-shaft which being thus forced in the direction of spring 25 disengage the disc-block 23 from the pressure exerted by this spring.

A second operation, permitted by the automatic release of the constantly braking block 23 by the above-mentioned operation, according to which the user, seated on seat 48 can, using the cranks 29, control the rotation of drive-shaft 15 which through the train of gears 14, 12 and 6 turns sheave 4 and thus rolls-up cable 31.

It is understood that to stop, it is sufficient to release the handles 29 to provoke automatically the return of the spring which acts in compression on the disc block 23, which enters into action and stops the rotation of the drive-shaft 15, and consequently of sheave 4.

During the upward movement, the user can also release the safety brake to compensate for any fault in the constant brake on the drive-shaft. For this it is sufficient to operate the hand-release 42 which brings the pawl 39 against the ratchet-wheel 35, to prevent any movement in reverse of sheave 4.

Downward movement at reduced variable speed is easily effected by using lever 11. In fact, as shown in FIG. 1, the user, drawing this lever towards himself, cancels out the effect of the constantly braking block 23 by means of the fork 33 which forces back the shaft 15 in the direction opposite to the compression of the block, and towards spring 25. Simultaneously the lever, while pivoting, causes the rotation of cam 10 and consequently the progressive separation of the shoes 8 of the drum brake 7. From this results the braking of the sheave 4 which unrolls the cable from which the apparatus is suspended, braking which can be sharp or progressive, according to speed at which the user wishes to descend.

In all cases, when the sheave accelerates rapidly as a result of the failure of one of the brakes, or when there is a fault in some part of the apparatus, the safety brake operates. In fact the rapid rotation of the sheave results in the rotation of cam 36 which is solidly joined to it. It follows that the projections 37 of the cam strike wheel 40 of the pawl 39 which, no longer subject to a sufficient pull of spring 41, engages in the notches of the ratchet-wheel and stops the rotation of sheave 4.

What is claimed is:

1. In an individual safety elevator, a seat fixed to a housing, a sheave rotatably mounted in said housing, a cable around said sheave and adapted to be wound and unwound, one outer extremity of said cable being attached to a fixed point in space, a control member for rotating said sheave through a gear-train in a cable winding direction, braking means for progressive braking of said sheave under the control of an outside lever, releasable friction means for automatic blocking said sheave, means to release said friction means under the action of said control member, means to release said friction means under the action of said lever, and centrifugally controlled locking means to stop automatically the rotation of said sheave when the speed of rotation of said sheave exceeds a predetermined value.

2. An elevator as set forth in claim 1, wherein said centrifugally controlled locking means comprises a ratchet-wheel and a cam member both rotating with said sheave, a rocking pawl oscillating on a pin carried by the housing under the action of said cam member and disposed in position so as to engage said ratchet-wheel and stop it when the speed of rotation of said sheave exceeds a certain value.

3. An elevator as set forth in claim 2, having means for manually engaging said pawl and said ratchet-wheel.

4. A safety elevator as defined in claim 1 in which said friction means includes a disc brake.

5. A safety elevator as defined in claim 1, wherein said centrifugally controlled locking means comprises a ratchet-wheel integral with said sheave and a centrifugally controlled pawl disposed in a position so as to engage said ratchet-wheel.

6. In an individual safety elevator, a seat fixed to a housing, a sheave rotatably mounted in said housing, a cable around said sheave and adapted to be wound and unwound, one outer extremity of said cable being attached to a fixed point in space, at least one crank mounted on an axially slidable drive-shaft and adapted to rotate said sheave through a gear-train in the cable winding direction, a drum brake comprising a drum fixed on said sheave and shoes whose spacing is controlled by an outside lever, a releasable friction means compressed between said housing and a plate fixed on said drive-shaft by a resilient member acting on said plate, means to cause the displacement of said drive-shaft and centrifugally controlled braking means to stop the winding of the cable off the sheave.

7. An elevator as set forth in claim 6, wherein operation of said lever causes displacement of said drive shaft in a direction correponding to the decompression of said friction means.

8. In an individual safety elevator, the combination of a seat fixed to a housing,
  a sheave rotatably mounted in said housing,
  a cable around said sheave and adapted to be wound and unwound,
  the outer extremity of said cable being attached to a fixed point in space,
  a pair of crank members mounted on a drive shaft on opposite sides of said housing for rotating said sheave through a gear train in the cable winding direction,
  braking mean for progressive braking of said sheave under the control of an outside lever,
  a pair of separable friction elements for automatically blocking said sheave,
  backing means on said drive shaft and connected to one of said friction elements,
  spring means for urging said one friction element against the other friction element,
  means for separating said friction elements under the action of one of said crank means,
  means for separating said friction elements under the action of said lever,
  a ratchet wheel and a cam member mounted for rotation with said sheave,
  and a rocking pawl oscillating under the action of said cam member,
  said rocking pawl being disposed in a position to engage and stop said ratchet wheel when the speed of rotation of said sheave exceeds a predetermined value.

References Cited in the file of this patent

UNITED STATES PATENTS

| | | |
|---|---|---|
| 2,558,122 | Barry | June 26, 1951 |
| 2,561,832 | Wilson | July 24, 1951 |
| 2,569,597 | Bailey | Oct. 2, 1951 |
| 2,918,136 | Faugier | Dec. 22, 1959 |

FOREIGN PATENTS

| | | |
|---|---|---|
| 521,950 | Belgium | Aug. 31, 1953 |